Sept 27, 1966   F. S. TADLOCK   3,275,034
IRRIGATION VALVE
Filed May 10, 1963
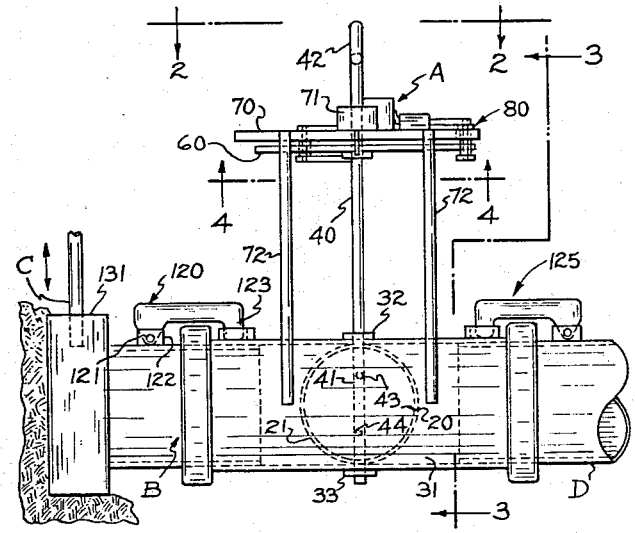
Fig. 1
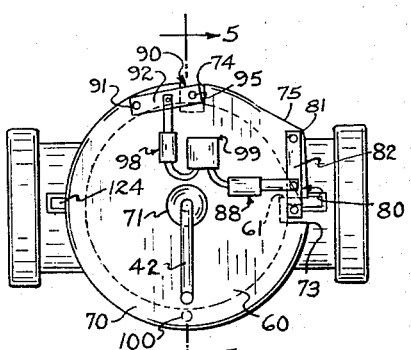
Fig. 2
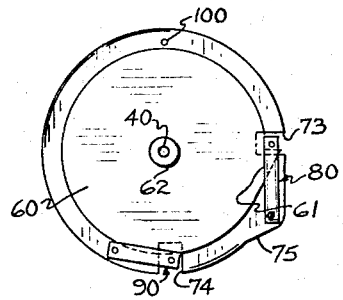
Fig. 4
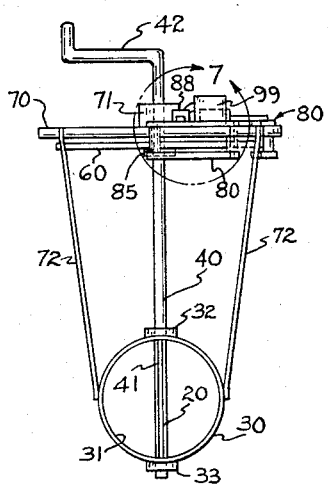
Fig. 3
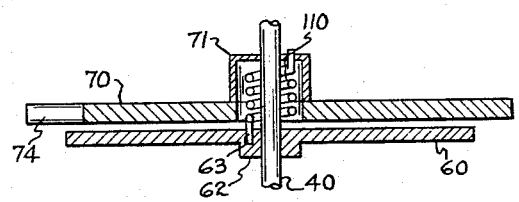
Fig. 5
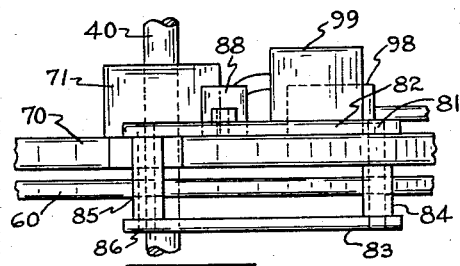
Fig. 7
Fig. 6
INVENTOR.
FRED S. TADLOCK
BY
Townsend and Townsend
Attorneys United States Patent Office 3,275,034
Patented Sept. 27, 1966

3,275,034
IRRIGATION VALVE
Fred S. Tadlock, 8 Jackson St., Woodland, Calif.
Filed May 10, 1963, Ser. No. 279,564
10 Claims. (Cl. 137—624.19)

This invention relates to an irrigation valve of the type which is connected between a water supply and an irrigation check.

An economic disadvantage of irrigating fields is in the amount of labor involved. It is usually necessary to have a person open the valves at the proper time and in the proper sequence. When the allotted water has passed into the checks it is then necessary to have a person close the valves. Thus it can be seen that large irrigation projects having many irrigation valves would require substantial labor expenditure.

This invention provides an irrigation valve which will reduce this labor expenditure in a simple and reliable manner.

An object of this invention is to provide an irrigation valve which can be manually preset to a closed position, and which will automatically open at a predetermined time, remain open for a predetermined time interval, and then automatically close.

A related object is to provide an irrigation valve having a cam or control wheel connected to pivot a valve plate mounted within the valve passageway by spring driven rotation between open and sealed relationship as stop means are moved out of engagement with a control tooth on the control wheel.

Another object of this invention is to provide an irrigation valve of the above type which can be initially preset with the plate in sealing relationship in the valve passageway, and which will rotate 90° to fully open communication through the passageway when a first pivotal stop means is disengaged from the control tooth and will rotate an additional 90° to again seal the passageway when the second pivotal stop means is disengaged from the tooth.

Another object of this invention is to provide a control means for a butterfly valve in which a control wheel is connected to spring drive the valve stem while movable stop means are positioned to engage the control wheel for stopping it and the connected valve stem at preselected angles. As a result, a butterfly disk is selectively positioned to regulate fluid flow through the valve thus eliminating control duties of an attendant.

Another object of the invention is to provide an automatic control means for an irrigation valve of the above described type in which a plurality of movable stop means can be selectively actuated by a timing means to open and close the valve at predetermined intervals.

A feature and advantage of this invention resides in the fact that the valve can be initially preset to open at a predetermined time and irrigate the field; at the end of a predetermined time interval, the valve again closes to shut off the irrigation water flow.

Another feature and advantage of this invention is that the large field or irrigation project can be watered with a minimum of manual labor.

It is another object of this invention to provide a portable irrigation valve having quick disconnect latches between the water supply pipe and the outlet pipe wherein the irrigation valve can be unlatched and moved to another location.

An advantage of this is that the controllable irrigation valve can be moved to new locations for irrigating other fields when the first field is not scheduled to be watered.

Another advantage of this invention resides in the fact that fewer valves are needed for watering large amounts of acreage.

Other objects, features and advantages of this invention will become apparent upon reading the following detailed description and referring to the accompanying drawings in which:

FIG. 1 is a side elevational view of the irrigation valve connected between the irrigation water supply and the outlet pipe;

FIG. 2 is a top plan view of the irrigation valve taken along the lines 2—2 of FIG. 1;

FIG. 3 is an end elevational view partly in cross-section, of the irrigation valve taken along the lines 3—3 of FIG. 1;

FIG. 4 is a bottom plan view of the control wheel and pivotal stop means taken along the line 4—4 of FIG. 1;

FIG. 5 is an enlarged cross-sectional end elevational view of the spring driven control wheel pivotally secured adjacent the upper mounting plate;

FIG. 6 is a fragmentary end view of the irrigation valve showing the valve plate in a closed position;

FIG. 7 is an enlarged fragmentary view of the pivotal stop means and control mechanism enclosed within the line 7—7 of FIG. 3.

As illustrated in the drawings, there is provided generally an irrigation valve having a plate 20 pivotally mounted within the passageway 31 of a valve case 30 by means of a vertically extending valve stem 40. A crank handle 42 is provided at the upper end of stem 40 for pivotally rotating plate 20 to seal and open communication through the valve passageway 31. A control wheel 60 having a control tooth 61 is secured to stem 40 in a horizontal plane parallel to and spaced slightly below an upper mounting plate 70. By pivotally mounting a pair of stop means 80 and 90 at spaced 90° intervals on mounting plate 70, they can swing into and out of the rotary path of control tooth 61. Thus by selectively actuating reciprocating relays 88 and 98 by means of the timing mechanism 99, the control wheel 60 will be rotated by a coil spring 110 in sequential 90° increments from engagement with stop means 90, to engagement with stop means 80, and finally to engagement with permanent stop means 100. As the control wheel 60 rotates through this 180° arc, the valve stem 40 pivots valve plate 20 through 180° to sequentially seal, open and again seal the valve passageway 31. When required, crank 42 can be again rotated 180° to rotate control tooth 61 into engagement with pivotal stop means 90 for recycling the gate.

Quick disconnects 120 and 125 can also be provided at the end of the valve case 30 so that the valve can be disconnected and removed to another section of field.

Referring generally to FIG. 1, the irrigation valve A is connected at one end to the outlet pipe B leading from a source of irrigation water (not shown). A vertically sliding gate C is positioned to transversely intersect the passageway in outlet pipe B to turn on and cut off water flow to irrigation valve A. The other end of irrigation valve A is connected to an outlet pipe D forming a path for distributing irrigation water. Thus when the sliding gate C is up and irrigation valve A is open, water flows from the reservoir or water source through the valve passageway 31 for distribution to the checks in the field.

Referring more specifically to the valve structure there is provided a hollow cylindrical valve case 30 through which is formed a passageway 31. An upper bearing means 32 and lower bearing means 33 are secured to the wall of valve case 30 at diametrically opposite points.

A valve plate 20 is pivotally mounted on the lower end of a valve stem 40 which extends through aligned openings formed through the upper and lower bearing means 32 and 33 and the case wall 30. Valve plate 20 is relatively thin having a general outline or shape substantially identical to the cross-sectional shape of passageway 31. In order to insure that all space or communication through the valve passageway will be sealed, a rubber gasket 21 is provided around the peripheral edge of valve plate 20.

The lower end of valve stem 40 has a bifurcating slot 41 for receiving valve plate 20 while the upper end of valve stem 40 has a crank handle 42 formed therewith. The bifurcating slot 41 is of substantially the same thickness as valve plate 20 and extends along stem axis sufficiently far so that valve plate 20 can be inserted therein. A pair of securing bolts 43 and 44 extend through valve stem and plate 20 to securely hold stem 40 across the face of valve plate 20 in substantially bisecting relationship. By turning crank handle 42, stem 40 can be rotated, thereby pivoting valve plate 20 within passageway 31.

A control wheel 60 is secured to valve stem 40 at a point intermediate of valve plate 20 and crank 42. Control wheel 60 is generally circular in shape having a control tooth 61 projecting outward at one point along the periphery. In order to securely lock control wheel 60 for rotation with stem 40, a hub 62 is formed at the center of the wheel. Stem 40 extends vertically through this hub 62 and is secured by welding, set-screws or any other conventional locking means.

The control tooth 61 is generally saw tooth in configuration having one edge extending substantially radially from the control wheel axis and a sloping secant edge.

By positioning an upper mounting plate 70 in a horizontal plane slightly above the plane of control wheel 60, control mechanism can be mounted for cooperation with control wheel 60. A plurality of upward extending support legs 72 are secured at their lower ends to valve case 30 by welding and at their upper ends to mounting plate 70 by welding or bolting or any other conventional means. These support legs 72 thus provide a support for a stabilized platform. A hollow hub-like portion 71 is formed at the center of control plate 70 and has an aperture in the center thereof for receiving valve stem 40. Relative rotation is thus permitted between valve stem 40 and mounting plate 70. The peripheral edge of mounting plate 70 is generally circular except for a pair of cutout indentations 73 and 74 and a projection 75 spaced between them. The indentations 73 and 74 are spaced at 90° apart and extend sufficiently far inward from the peripheral edge of mounting plate 70 that control tooth 61 is exposed when it rotates by.

A pair of pivotal stop means 80 and 90 are mounted on plate 70 so that the free end will swing into and out of the indentations 73 and 74 and obstruct the path of travel of control tooth 61 at spaced intervals of 90°. On pivotal stop means 80, a pivot pin 81 secures one end of the upper and lower superposed pivot arms 82 and 83, one above and one below, mounting plate 70. In order to space lower pivot arm 83 below the plane of control wheel 60, a spacer means 84 is coaxially mounted on pivot pin 81 below mounting plate 70 thereby keeping pivot arm 83 from moving upward axially along the pivot pin. The free end of pivot means 80 has a low-friction cylindrical roller means 85 mounted on a pin 86 extending vertically through the upper and lower pivot arms 82 and 83. In operation, the control tooth 61 engages this roller as will be explained shortly. Since the embodiment of pivotal stop means 90 is substantially the same as pivotal stop means 80, there is no need to describe the structural details. One difference does exist as to the exact point of mounting. Because control tooth 61 is not normally rotated counterclockwise (as viewed from FIG. 2) substantially beyond pivotal stop means 90 when fully set, there is no need to space pivot pin 91 radially outward to provide additional clearance for tooth rotation. Since, however, control tooth 61 does normally rotate past pivot pin 81, this pin has been mounted on the peripheral projection 75 thereby providing clearance for the tooth.

Each pivotally mounted stop means 80 and 90 has a relay actuated plunger means 88 and 98, respectively, connected to the upper pivot arm at a point between the pivot pin and the roller means. Such a connection thus makes each of the pivotal stop means a second-class or second-order lever wherein actuation of the respective relays will swing the respective roller ends outwardly from the indentations. The other ends of relays 88 and 98 are connected or secured to a mounting plate 70 for stabilization. A timing means 99 is also secured on top of mounting plate 70 and is connected to relays 88 and 98 by means of appropriate wires. This timing means 99 can be of any conventional type which will selectively energize the relays 98 or 88 at timed intervals. Although an electrical timing means 99 and relay means 88 and 98 have been illustrated, it is also possible to use mechanical timing and relay means with this irrigation valve.

In addition to the pivotally mounted stop means 80 and 90, a stationary stop means 100 is secured to mounting plate 70 to extend downward into the path of the control tooth's travel. This stationary stop means 100 is spaced 90° from pivotal stop means 80, thus limiting further rotation of control wheel 60 beyond a total of 180°.

A coil spring means 110 is enclosed within the housing 71 on the top of mounting plate 70 and extends vertically along a section of valve stem 40 for biasing the control wheel in a clockwise direction. The upper end of coil spring 110 is secured to housing 71 by means of an aperture through the upper wall or by any other conventional way. The lower end of spring 110 is secured to a receptacle 63 in the hub portion of control wheel 60. Thus it can be seen that as the control wheel 60 is rotated counterclockwise (as viewed from the top), coil spring 110 tensions to provide a biasing force which will resiliently urge the wheel back in the clockwise direction.

In operation, and in the unset condition, the radially extending edge of control tooth 61 is biased against the permanent stop means 100. With control wheel 60 in this position, the valve plate 20 is positioned in a plane which is normal to the direction of water flow, thus obstructing and blocking the flow of irrigation water. In order to set the irrigation valve, the crank handle 42 is moved counterclockwise (as viewed from the top) thus simultaneously rotating the valve stem 40, connected control wheel 60 and valve plate 20. After nearly 90° of counterclockwise rotation, the sloping or slanting secant edge of control tooth 61 contacts the roller 85 of pivotal stop means 80 to kick it out of the way. When wheel 60 has completed approximately 90° of rotation, the radially extending edge of control tooth 61 is effectively past the roller means 85 thereby permitting the pivotal stop means to drop back down within the indentation or recess 73. With control wheel 60 in this position, the valve plate 20 is positioned in the plane parallel to the direction of irrigation water flow such as shown in FIGS. 1 and 3 and effectively fully open.

Upon rotating control wheel 60 another 90°, for a sum total of 180°, substantially the same outward kicking action occurs at pivotal stop means 90. First the slanting secant edge of control tooth 61 kicks stop means outward until the substantially radially extending edge passes the roller 95 wherein the pivotal stop means 90 falls back down into the recess or slot 74. With the control wheel 60 in this position, the coil spring 110 exerts a substantially biasing force in the clockwise direction to urge or set the radially extending leading edge of control tooth 61 against the roller 95. In this set position, valve plate 20 is again in a plane which is normal to the direction of irrigation water flow, thus blocking the passageway 31.

With the irrigation valve in the fully set position, a farmer or helper can set the timing device 99 so that relay 98 will be actuated at a certain time and relay 88 will be subsequently actuated at a predetermined time thereafter thus resulting in a complete watering cycle. As relay 98 is first actuated it pivotally swings roller means 95 outward thereby removing the first obstruction in the path of control tooth 61. The tensioning forces of coil spring 110 then drive the control wheel 60 in a clockwise direction until the leading edge of control tooth 61 contacts the second pivotally mounted roller means 85. As previously mentioned the valve plate 20 is fully opened when control tooth 61 is in contact with pivotal stop means 80. Thus irrigation water flows out through passageway 31 into the field. After a predetermined time interval, timing means 99 actuates relay 88 causing the pivotally mounted roller means 85 to swing outwardly again removing an obstruction in the path of control tooth 61. The coil spring 110 again drives the control wheel 60 in a clockwise direction until the leading edge of control tooth 61 contacts the non-movable stop means 100 projecting into its path of movement. With control wheel 60 in this position, the valve plate 20 is in a plane normal to the direction of water flow and in the fully closed position thereby blocking passageway 31 against irrigation water flow. Thus it can be seen that irrigation can be started at any predetermined time and shut off after a preset time interval with one manual setting operation. This results in a substantial reduction in the labor expenditure in irrigating a field and increases the chances of acquiring adequate and complete watering. It is possible therefore to insure that the fields receive neither too much nor too little water.

The above described and illustrated embodiment refers to a control means having two pivotally mounted stop means 80 and 90 and a permanent stop means 100 each connected to limit the rotation valve plates 20 to 90° increments for a total of 180° of rotation. It would also be possible to arrange a plurality of pivotal stop means, such as 80, whereby the valve plate will be spring driven through at least 360° to obtain two or more irrigation cycles from one setting.

If a person wishes to transport irrigation valve A to another section of the field, quick disconnect latches 120 and 125 can be released and the valve removed. Prior to removing irrigation valve A the sliding gate C is moved vertically downward into the abutment 131 to block the flow of irrigation water through pipe B. With the water flow thus blocked, the latch means 120 can be pivoted upward on pin 121 extending through the rabbit ear projections 122 on pipe B. When the downward depending end 123 of the latch arm is lifted free of slot 124 in latch receptacle 125 secured to the top of the valve case 31, irrigation valve A can be disconnected from inlet pipe B by sliding it axially until the overlapped or telescoping portions are free. A second latch means such as 125 can also be provided on an outlet pipe when desired. Since it is similar to the latch means 120, there is no need to explain the second valve in detail. With irrigation valve A thus removed, it is possible to transport the valve to another section of the farm for irrigation purposes. When it is again necessary to irrigate the first portion of the field, the valve is similarly disconnected from the second location and taken back to the first location.

Although one embodiment of this invention has been described in detail for purposes of explanation, it should be understood that other changes can be made in the structural detail shape and design without departing from the scope of the invention as set forth in the appended claims.

It is claimed:

1. A valve for the control of the flow of water in an irrigation line comprising: valve case means having a passageway extending therethrough for receiving a flow of water; a valve plate pivotally mounted in said passageway for blocking and releasing the flow of water; and a stem extending through said valve case means and secured to said valve plate for pivotal movement thereof; said valve plate having at least three successive positions, the first position wherein said valve is closed, a second position wherein said valve is open and a third position wherein said valve is closed; a control wheel spaced from said valve case means and secured to the extended stem so that the position of said valve plate will be varied by rotation of said control wheel; a mounting plate spaced from said valve case means and adjacent said control wheel; a plurality of outward extending support legs, each secured at one end to said valve case means and at the other end to said mounting plate; coil spring means connected between said mounting plate and said control wheel to rotatably urge said control wheel in one direction; a plurality of spaced movably mounted stop means connected to said mounting plate to engage cooperating stop structure on said control wheel and prevent spring driven rotation beyond predetermined positions; said mounting plate having a surface area spaced outside of the external perimeter of movement of said stop structure on said control wheel; said first movably mounted stop means being constructed and arranged to cooperate with said stop structure to lock the wheel in said first valve position against rotation by the spring, and said second movably mounted stop means being attached to said mounting plate at the surface area spaced outside of the external perimeter of said movement of said stop structure to cooperate with said stop structure to lock said control wheel in said second valve position against rotation by the spring; said second stop means being related to the stop structure in such a manner that moving said stop means releases the wheel for rotation by said spring; third stop means connected in spaced relationship from said second movable stop means being adapted to position said plate means in said third position; and actuating means for sequentially moving said first and second stop means to release said control wheel to cause said plate means to sequentially move from closed to open and back to closed.

2. The valve of claim 1 wherein said first and second movable stop means are pivotally mounted stop means, and each comprises a pair of parallel members fixedly spaced apart, said members being positioned on opposite sides of said control wheel.

3. The valve of claim 2, said actuating means including a first and a second reciprocal relay connected to selectively pivot said first and second stop means respectively to release said control wheel.

4. The valve of claim 3, said actuating means including timing means connected to first and second relays for selective reciprocal actuation at predetermined times.

5. The valve of claim 1 in which the first and second stop means includes a low friction roller for engaging the control tooth.

6. The valve of claim 1 including at least one latch receptacle secured adjacent one end of said valve case for receiving a movable locking member.

7. The valve of claim 1 in which the stop structure is a generally sawtooth member having a secant edge and a substantially radially extending edge; and said movable stop means is a pivotally mounted arm member and adapted to swing outward when contacted by the sawtooth secant edge when said control wheel is rotated against spring bias and said arm member is adapted to be engaged by the sawtooth radially when the control wheel is biased in the direction of spring force.

8. The valve of claim 7 including a crank means connected for rotating said control wheel against the spring bias force to reset the valve.

9. The valve of claim 1 wherein said movable stop means are mounted on said mounting plate at spaced intervals of effectively 90°.

10. The valve of claim 1 wherein said coil spring is positioned within a recess of said mounting plate.

References Cited by the Examiner

UNITED STATES PATENTS

| | | | |
|---|---|---|---|
| 689,598 | 12/1901 | Sigurdsson | 137—624.19 X |
| 1,104,955 | 7/1914 | Bellows | 285—320 |
| 1,182,678 | 6/1931 | Bernert | 285—320 |
| 2,354,366 | 7/1944 | Fisher | 137—624.22 |
| 2,809,662 | 10/1957 | Ray | 251—68 X |
| 3,048,190 | 8/1962 | Carling | 137—624.11 |

WILLIAM F. O'DEA, *Primary Examiner.*

ISADOR WEIL, ALAN COHAN, *Examiners.*

A. ROSENTHAL, *Assistant Examiner.*